United States Patent [19]
Garger et al.

[11] Patent Number: 6,029,170
[45] Date of Patent: Feb. 22, 2000

[54] HYBRID TREE ARRAY DATA STRUCTURE AND METHOD

[75] Inventors: Valery I. Garger, Ithaca; Ann Marie Shepherd, Endwell, both of N.Y.

[73] Assignee: International Business Machines Corporation, Armonk, N.Y.

[21] Appl. No.: 08/977,700

[22] Filed: Nov. 25, 1997

[51] Int. Cl.[7] .................................................. G06F 17/30
[52] U.S. Cl. ................................ 707/100; 707/1; 707/3
[58] Field of Search .............................. 707/1, 100, 103, 707/3

[56] References Cited

U.S. PATENT DOCUMENTS

| | | | |
|---|---|---|---|
| 3,596,258 | 7/1971 | Choate et al. | 706/14 |
| 3,938,105 | 2/1976 | Lechner | 711/220 |
| 4,468,728 | 8/1984 | Wang | 364/200 |
| 5,303,367 | 4/1994 | Leenstra, Sr. et al. | 395/600 |
| 5,446,888 | 8/1995 | Pyne | 395/600 |
| 5,497,485 | 3/1996 | Ferguson et al. | 707/1 |
| 5,504,890 | 4/1996 | Sanford | 395/600 |
| 5,530,957 | 6/1996 | Koenig | 707/100 |
| 5,600,826 | 2/1997 | Ando | 707/103 |
| 5,611,076 | 3/1997 | Durflinger et al. | 395/613 |
| 5,649,191 | 7/1997 | Hirano et al. | 395/613 |
| 5,829,004 | 10/1998 | Au | 707/100 |

OTHER PUBLICATIONS

Donald Knuth, "The Art of Computer Programming, vol. 1: Fundamental Algorithms" (Reading, Mass. 1973), pp. 347–351, Jan. 1971.

*Primary Examiner*—Paul R. Lintz
*Attorney, Agent, or Firm*—Schmeiser, Olsen & Watts; Arthur J. Samodovitz

[57] ABSTRACT

The preferred embodiment of the present invention provides a method and apparatus for storing and accessing data. The preferred embodiment hybrid tree-array database provides the ability to perform fast searching using tree database search techniques and the ability to search all user data fields using array search techniques. In particular, fast key searching as a typical tree database and sequential array searching of all data fields as a typical array database are provided in a single database, without requiring the user data be duplicated and stored in two separate databases. Thus, the preferred embodiment provides searching flexibility without the excessive storage requirements and complexity inherent in managing separate array and tree databases. The preferred embodiment also provides the advantage of allowing individual users of the database to search the data using either tree or array search techniques without requiring any detailed knowledge of the dual nature of the hybrid tree-array database.

54 Claims, 8 Drawing Sheets

HYBRID TREE ARRAY DATA STRUCTURE AND METHOD

BACKGROUND OF THE INVENTION

1. Technical Field

The present invention relates in general to computer programs. More specifically, the present invention relates to data structures in computer systems.

2. Background Art

The development of the EDVAC computer system of 1948 is often cited as the beginning of the computer era. Since that time, computer systems have evolved into extremely sophisticated devices that may be found in many different settings. Computer systems typically include a combination of hardware (e.g., semiconductors, circuit boards, etc.) and software (e.g., computer programs). As advances in semiconductor processing and computer architecture push the performance of the computer hardware higher, more sophisticated computer software has evolved to take advantage of the higher performance of the hardware, resulting in computer systems today that are much more powerful that just a few years ago.

One of the fundamental issues faced by computer programmers is the selection of appropriate data structures. In many applications, the choice of the appropriate data structure is the most important decision in shaping the application. Several types of data structures are commonly used in computer programming such as, arrays, linked lists, stacks, trees, etc. Each of these data structures has certain advantages and limitations. Typically, the most important aspect of a data structure is the speed at which desired data can be located and retrieved. Naturally, different types of data structures excel at different types of searches. Often, the data structure selected for a particular application is selected because of its ability to perform a needed type of search quickly and efficiently.

Two of the most commonly used data structures are arrays and trees. An array is typically defined as a fixed number of data items that are stored contiguously and that are accessible by an index. The array data structure defines a plurality of elements, with each element contained in a portion of the storage space.

Arrays generally excel at searches that require all data fields to be examined. This type of searching, called a sequential array search, generally involves selecting a portion of data storage to be searched, analyzing all the data in that portion, and moving to the next portion until all the data in the array has been searched. Thus, sequential array searches search the elements in the array in the order in which they are in storage. Arrays excel at this type of searching because multiple contiguous elements in the array can be examined at once. Multiple contiguous elements can be searched at once because the order of the search is immaterial as all data needs to be searched. This allows the search to progress quickly until all the data has been searched. The performance of the array search is even more impressive when efforts are made to avoid fragmentation of the storage space. When the array is so maintained, large portions of the data can be examined at once and hardware optimization techniques which "look ahead" at the next block of data can further improve search time.

Figure 9:
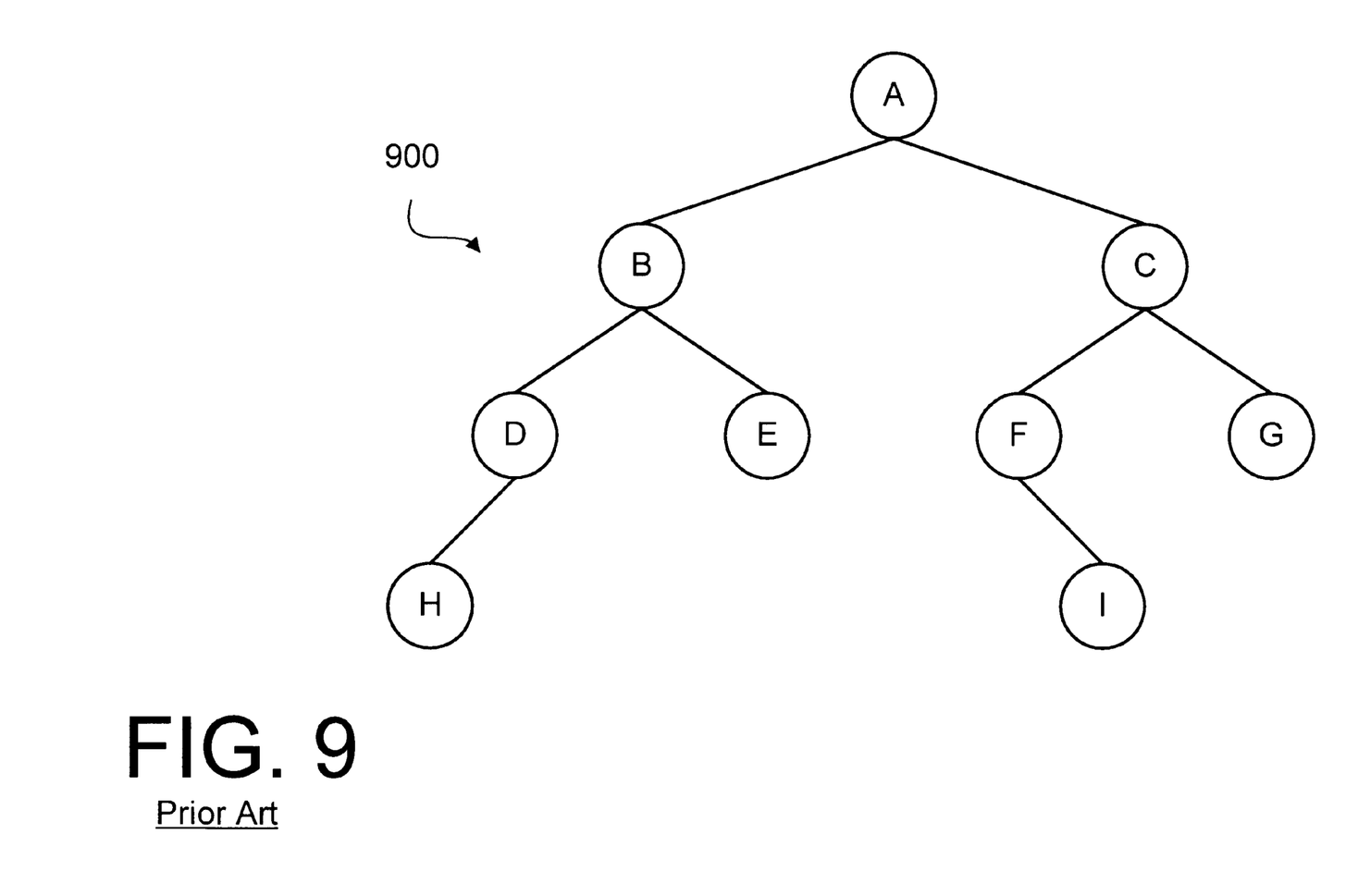
FIG. 9 is a schematic representation of a prior art binary tree.

Tree data structures are another commonly used data structure. A tree is generally defined as a finite set of elements, called nodes, linked together from a root node to a plurality of leaf nodes (with leaf nodes generally residing at the bottom of the tree and having no children nodes). Data is stored in the nodes and can be referenced using the links from root node to leaf nodes. A binary tree is a tree in which each node except the root has one parent node and all nodes have at most two children nodes. An example of a binary tree is shown as tree 900 in FIG. 9. Tree 900 includes a plurality of nodes A, B, C, D, E, F, G, H, and I. A is the root node, with B and C being the children of A. Likewise B is the parent node of D, and H is the child node of D. Binary trees are especially useful when two-way decisions must be made at each point in a process. A "balanced" binary tree is a binary tree in which the heights (the maximum level of its leaves) of the two subtrees of every node never differ by more than one.

Searching through binary trees can be done simply and efficiently using a technique called "key searching." Each node in the binary tree is assigned a key value, with the tree arranged such that all nodes with small keys are in the left subtree of a node and all nodes with larger (or equal) key values are in the right subtree of the node. With the tree so arranged, a search for a particular key value can be preformed extremely efficiently. For example, to find a node with a given value, first compare the value to the key value at the root. If the value is equal, the current tree node contains the data being searched for and the search is over. If the value is smaller, go to the left sub-tree, if it is larger go to the right subtree. When this method is continued recursively, each comparison step shrinks the remaining number of nodes to be searched in half. This results in a key value search that is highly efficient.

An even more efficient version of the tree is called the Patricia tree. A Patricia tree has several key properties. First, in a Patricia tree a leaf node is any child node that receives an upwards links from its parent node which resides on the same or lower level as the child node. Additionally, every node in a tree is some other node's leaf or its own leaf. A Patricia tree uses key bit comparison to facilitate searching for N long keys in just N nodes, while requiring only one full key comparison per search. In particular, in a Patricia search only one bit in the searched key is examined at each node, if the bit is 1 the search goes right, if the bit is a 0, the search goes left. This is continued until an upwards link is encountered. The upwards link points back to a leaf node whose tree key will match the one being searched for if the search is successful. If the tree key does not match, the search is unsuccessful. Thus, in a Patricia tree one full key comparison is required to determine if the search is successful or not. This process results in a very fast and efficient search with only one full key comparison being required.

Trees are thus known to provide the ability to perform very fast and efficient key searches. Thus, when a very fast search is needed a tree data structure is set up with the appropriate keys to facilitate the desired search. There are several limitations to the tree data structure however.

In particular, while trees provide for fast key searching, full data field searching through an entire tree is extremely inefficient. This is because the linked nature of the tree causes the data search to have to search the node in memory storage, and then jump to a parent or child node, which may be stored in a completely different portion of memory storage, search there, and jump again until the entire tree is searched. Because the search must follow the pointers from memory storage portion to memory storage portion, hardware optimization routines are not as effective. Furthermore, the speed of the search is also limited because only small portions of data (one node) are grabbed each time, while an array can grab an entire contiguous memory portion to facilitate reading ahead. Thus, while the tree can provide very fast searching for a particular key, it cannot provide efficient full data searching. If fast key searching and relatively fast full data searching are required both a tree data structure and an array data structure must be built and maintained, with both the tree and the array having a complete copy of all the pertinent data. This duplication of data requires an excessive use of storage space and also can lead to synchronization problems.

A second limitation exists because a different tree is required for each type of key to be searched. A tree designed and built to search under a dollar amount key cannot use a key search to find data based on dates. Thus, if two types of key searches are required two tree data structures must be implemented, with each data structure having an entire copy of all the data. Again, this duplication requires the excessive use of storage space and also can lead to synchronization problems.

Thus, without an improved mechanism storing data, the efficient storage and retrieval of data will continue to be hampered.

SUMMARY OF THE INVENTION

The preferred embodiment of the present invention provides a method and apparatus for storing and accessing data. The preferred embodiment hybrid tree-array database provides the ability to perform fast searching using tree database search techniques and the ability to search all user data fields using array search techniques. In particular, fast key searching as a typical tree database and sequential array searching of all data fields as a typical array database are provided in a single database, without requiring the user data be duplicated and stored in two separate databases. Thus, the preferred embodiment provides searching flexibility without the excessive storage requirements and complexity inherent in managing separate array and tree databases. The preferred embodiment also provides the advantage of allowing individual users of the database to search the data using either tree or array search techniques without requiring any detailed knowledge of the dual nature of the hybrid tree-array database.

Thus, the preferred embodiments have the advantage of providing data storage that can be quickly accessed using a wide variety of methods without requiring excessive storage space.

DESCRIPTION OF THE PREFERRED EMBODIMENTS

Figure 1:
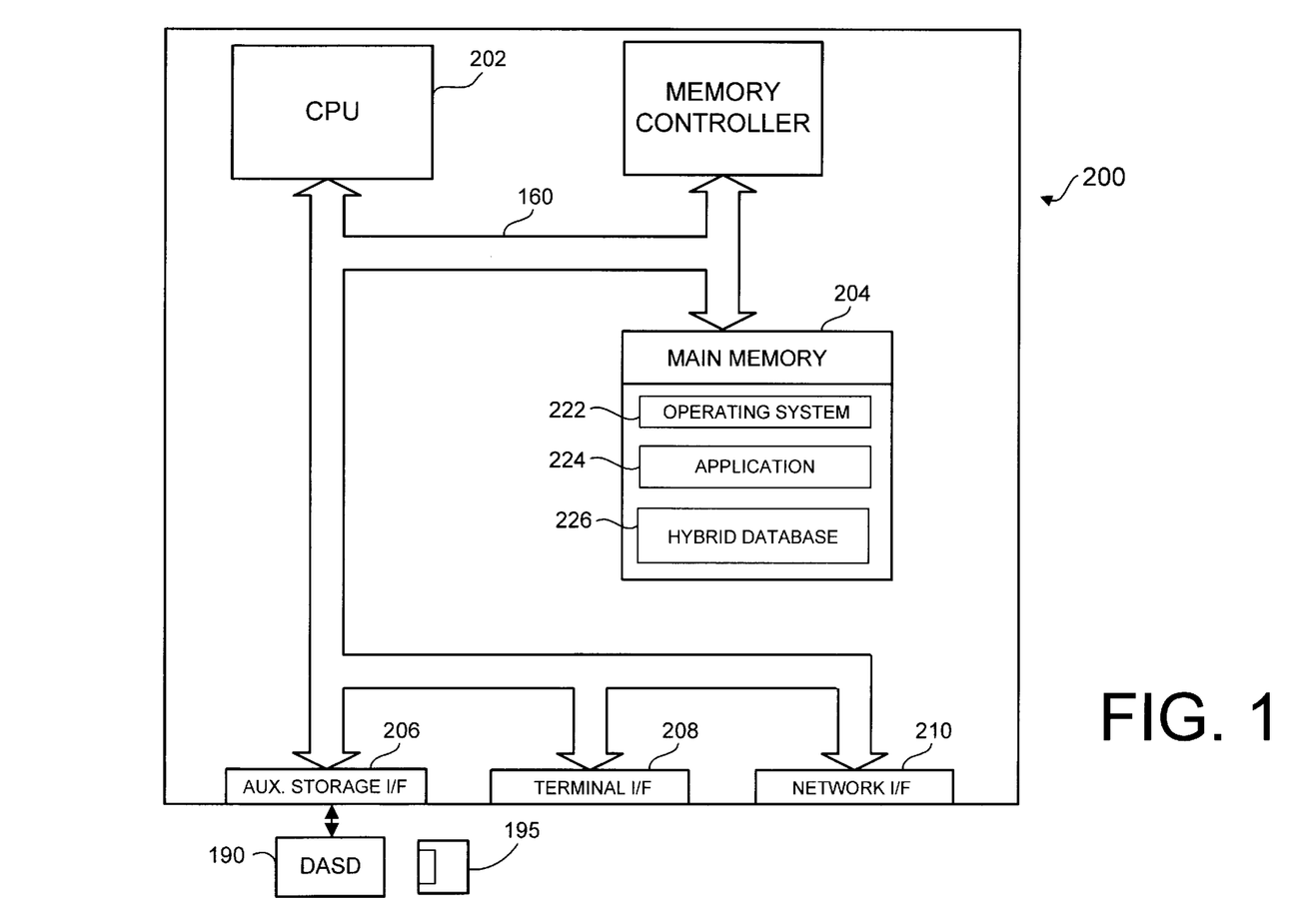
FIG. 1 is a block diagram view of a computer system in accordance with the preferred embodiment.

Referring now to FIG. 1. a block diagram of a computer system 200 is shown to illustrate a preferred embodiment of the present invention. The computer system 200 can be any suitable system, such as a mainframe, a minicomputer, an IBM compatible personal computer, a Unix workstation, or a network computer. However, those skilled in the art will appreciate that the mechanisms and apparatus of the present invention apply equally to any computer system, regardless of whether the computer system is a complicated multi-user computing apparatus or a single user personal computer. As shown in the block diagram of FIG. 1, computer system 200 comprises main or central processing unit (CPU) 202 connected to main memory 204, auxiliary storage interface 206, terminal interface 208, and network interface 210. These system components are interconnected through the use of a system bus 160. Auxiliary storage interface 206 is used to connect mass storage devices (such as DASD) devices 190 which stores data on a disk 195) to computer system 200.

Main memory 204 contains an operating system 222 and an application 224. In accordance with the preferred embodiment the main memory will also include a hybrid tree-array database 226. The hybrid tree-array database 226 is used to provide data storage that can be quickly searched using both tree search techniques and sequential array searching, without requiring a duplication of data. Computer system 200 preferably utilizes well known virtual addressing mechanisms that allow the programs of computer system 200 to behave as if they only have access to a large, single storage entity instead of access to multiple, smaller storage entities such as main memory 204 and DASD devices. Therefore, while operating system 222, application 224 and hybrid tree-array database 226 are shown to reside in main memory 204, those skilled in the art will recognize that these programs are not necessarily all completely contained in main memory 204 at the same time. It should also be noted that the term "memory" is used herein to generically refer to the entire virtual memory of computer system 200.

Although computer system 200 is shown to contain only a single main CPU and a single system bus, those skilled in the art will appreciate that the present invention may be practiced using a computer system that has multiple CPUs and/or multiple buses.

Terminal interface 208 is used to directly connect one or more terminals to computer system 200. These terminals may be non-intelligent or fully programmable workstations, and are used to allow system administrators and users to communicate with computer system 200.

Network interface 210 is used to connect other computer systems and/or workstations to computer system 200 in networked fashion. For example, the network interface can include a connection to the Internet and the World-Wide-Web or internal web-based systems (typically called intranets). The present invention applies equally no matter how computer system 200 may be connected to other computer systems and/or workstations, regardless of whether the connection is made using present-day analog and/or digital techniques or via some networking mechanism of the future.

Operating system 222 can be any operating system, such as OS/2, Windows, AIX, OS/400, OS/390, MVS etc, but is preferably an operating system that provides high performance database accesses, and those skilled in the art will appreciate that the spirit and scope of the present invention is not limited to any one operating system.

Application program 224 can be any type of application program which accesses data stored in hybrid tree-array database 226. Thus, the application could comprise a computerized catalogue, process documentation, inventory, personal lists or data warehouses to name several examples.

Hybrid tree-array database 226 provides a data storage structure that allow users to use both tree database search techniques and array database search techniques without requiring duplicates of the data to be made. It should also be noted that the term "data," when used in this specification can include any type of computer stored information, such as numbers, text, graphics, formulas, tables, audio, video, multimedia or any combination thereof. Hybrid tree-array database 226 can be implemented as part of the application 224 or as part of the operating system 222, but is preferably implemented as a separate database product that can be adapted to provide data storage for a wide variety of applications.

It is important to note that while the present invention has been (and will continue to be) described in the context of a fully functional computer system, those skilled in the art will appreciate that the mechanisms of the present invention are capable of being distributed as a program product in a variety of forms, and that the present invention applies equally regardless of a particular type of signal bearing media used to actually carry out the distribution. Examples of signal bearing media include: recordable type media such as floppy disks, hard drives, CD-ROMs and transmission type media such as digital and analog communication links over electrical, optical, and wireless mediums.

Figure 2:
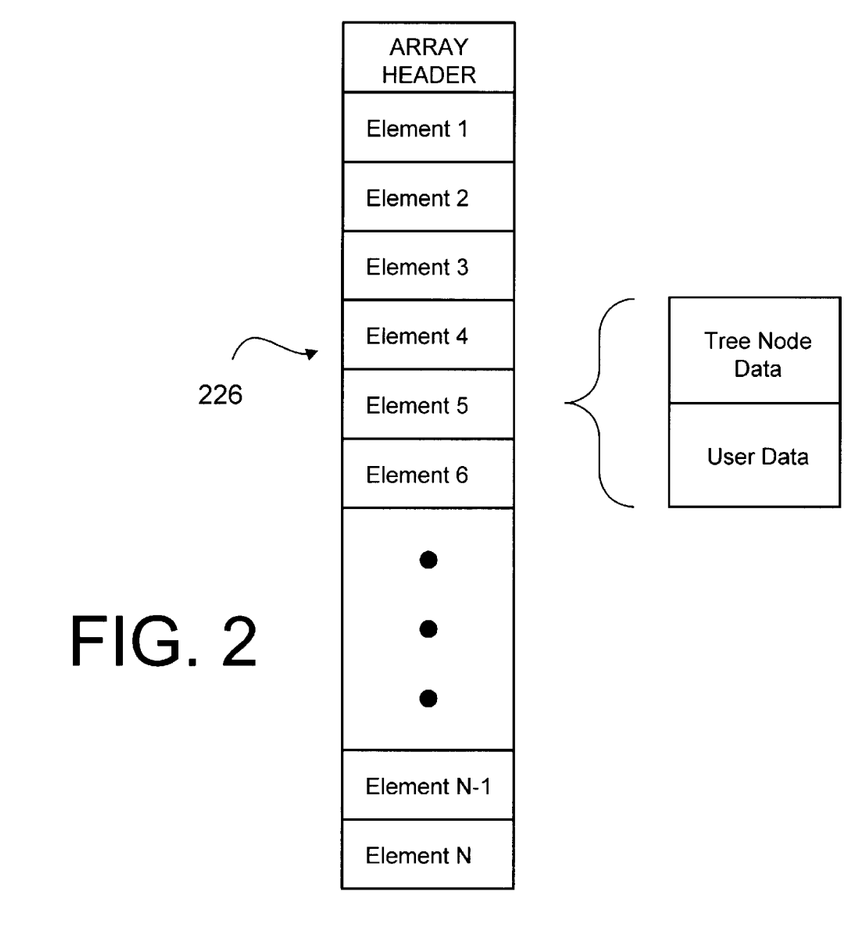
FIGS. 2–5 are schematic representations of a hybrid tree-array database in accordance with the preferred embodiment.

Turning now to FIG. 2, a hybrid tree-array database 226 in accordance with the preferred embodiment is illustrated schematically. The preferred embodiment hybrid tree-array database 226 provides the ability to perform fast searching using tree database search techniques and the ability to search all user data fields using array search techniques. In particular, the preferred embodiment can be used to provide both fast key searching as a typical tree database and sequential array searching of all data fields as a typical array database (including the benefits of contiguous storage and hardware optimization) in a single database structure, without requiring the user data be duplicated and stored in two separate databases. Thus, the preferred embodiment provides searching speed and flexibility without the excessive storage requirements and complexity inherent in managing separate array and tree databases. The preferred embodiment also provides the advantage of allowing individual users of the database to search the data using either tree or array search techniques without requiring any detailed knowledge of the dual nature of the hybrid tree-array database 226.

Hybrid tree-array database 226 is preferably implemented using an array to store data and a tree interfacing with the data to provide tree search capability. In particular, data is stored in a plurality of array elements, with each array element that contains user data having a corresponding tree node implemented. The tree node is preferably implemented by tree node data stored in the array element with the user data, but can also be implemented as tree node data stored elsewhere by including index-pointers to the user data in the array element. In this application the term index-pointer is defined to include any data string used to identify the location of an item, such as an index used to identify the position of an element in an array, a pointer containing the actual memory address of the item, or any other reference mechanism.

Since the user data is stored and managed by the array portion, the tree portion of hybrid tree-array database 226 does not obtain or release any storage space for the user data. By using the array portion of hybrid tree-array database to control the data storage assignments, the fragmentation of data storage that normally occurs in a tree data structure is avoided using known array data storage techniques.

In particular, the array adds new user data to previously vacated element slots whenever possible, thus preserving contiguous storage whenever possible. In contrast, typical tree databases allocated and released storage every time nodes are added or deleted from the tree, resulting in high amounts of data fragmentation. Thus, the preferred embodiment allows user data to be stored and searched as an array, resulting in efficient storage with minimal fragmentation and full data field search capability. Additionally, the preferred embodiment allows the user data to be viewed as a tree, with every node filled as required by the tree structure and providing the ability to search the user data using known tree search routines.

In FIG. 2, Hybrid tree-array database 226 is implemented using an array having a plurality of elements 1-N. In accordance with the preferred embodiment, each element includes tree node data and user data, as illustrated in FIG. 2 for element 5. Hybrid tree-array database 226 also includes an array header used to store information regarding the structure of hybrid tree-array database 226. As will be explained in greater detail later, the array header and the tree node data are used together to provide tree-type fast key searching and sequential array searching of the user data in elements 1-N. Tree key searching using the tree structure and keys to provide ultra fast searching for user data associated with a particular key. Sequential array searching involves selecting a portion of data storage to be searched, analyzing all the data in that portion, and moving to the next portion until all the data in the array has been searched. Thus, sequential array searches search the elements in the array in the order in which they are in storage, resulting in a relatively fast full user data search.

Hybrid tree-array database 226 can be implemented using a wide variety of array and tree database techniques. For example, both the array and tree can be implemented using object-oriented technologies, or regular procedural techniques. The array could be implemented as a one-dimensional array, a multi-dimensional array, a packed array, etc. The array functionality can be implemented using any type of unordered array structure but is preferably implemented using a relocatable unordered array structure. The tree functionality of hybrid tree-array database 226 can be implemented using any type of tree structure, such as a binary tree, a balanced tree or a Patricia tree. The ability to use a wide variety of tree and array types in the preferred hybrid tree-array database gives the preferred embodiment the flexibility to adapt to a wide range of uses.

In the preferred embodiment the tree portion of hybrid tree-array database 226 the tree aspects of hybrid tree-array database is implemented using an object-oriented Patricia tree. Patricia trees are well known trees that facilitate searching for N long keys in just N nodes, while requiring only one full key comparison per search. This results in a fast and efficient search. The object-oriented nature provides programmers with the ability to reuse structures and methods that are already written (usually from previous projects) which allows them to create databases and applications faster.

In the preferred embodiment hybrid tree-array database 226 is implemented using an unordered array. In unordered arrays the user data can be put into any available element slot, as opposed to an ordered array that requires that data be placed into elements in a specified order. Unordered arrays reference elements using indices that specify the element to be accessed. For example, index A[12] is used to reference the user data stored in the twelfth slot of array A.

In the preferred embodiment, the unordered array is relocatable in main memory. This allows the user data of the hybrid tree-array database 226 to be stored with minimal fragmentation. In particular, when the memory portion containing hybrid tree-array database 226 is full and new elements need to be added, the relocatable nature allows it to be transferred to an area having more contiguous memory. By transferring to an area of more contiguous memory, the new elements can be added contiguous with the old. If hybrid tree-array database 226 was not relocatable then other data occupying adjacent portions of storage would prevent the new elements from being stored continuous with the old. By keeping the elements contiguous in storage the performance of sequential array searches can be maximized using well known optimization techniques.

In an alternate embodiment, a non-relocatable array can be used. In this case, hybrid tree-array database 226 would have to include the full memory storage addresses of the elements. This embodiment may have the advantage of easier implementation and administration but at the expense of sequential array search performance.

In the preferred embodiment when hybrid tree-array database 226 elements are deleted they are marked as vacated. This can be done in several ways. For example, the first byte of an array key can be set to HEXADECIMAL "00" to signify that this element is vacant. This directs the sequential array search routine to skip this element. Otherwise, old data remaining in the vacated element could be searched and spurious data returned.

A list of the vacated elements is preferably kept by hybrid tree-array database 226. This list is used when new data is added to hybrid tree-array database 226 such that vacated elements are filled before data is added to elements that have never been used. Any order of re-using vacated slots can be used, for example first in—first out, where the first elements vacated are the first filled, or first in—last out, where the last element vacated is the next to be filed. As an example of first in—last out, if elements 5, 9, 3 and 7 are vacated and listed in that order, new data would be first added to element 7, then to element 3, then to element 9, and then to element 5 before a previously unused element slot is used.

In an alternative embodiment empty elements could be "zeroed out" (i.e., all bytes in the slot set to zero). Thus, no spurious data is there to be searched by the sequential array search routine. In another alternative embodiment, a delete flag is used to signify vacated elements. In all of these embodiments the key feature is that the sequential array search routine does not find bad data in vacated elements, either by zeroing out the data, or by signifying to the search routine which elements are to be skipped.

Figure 3:
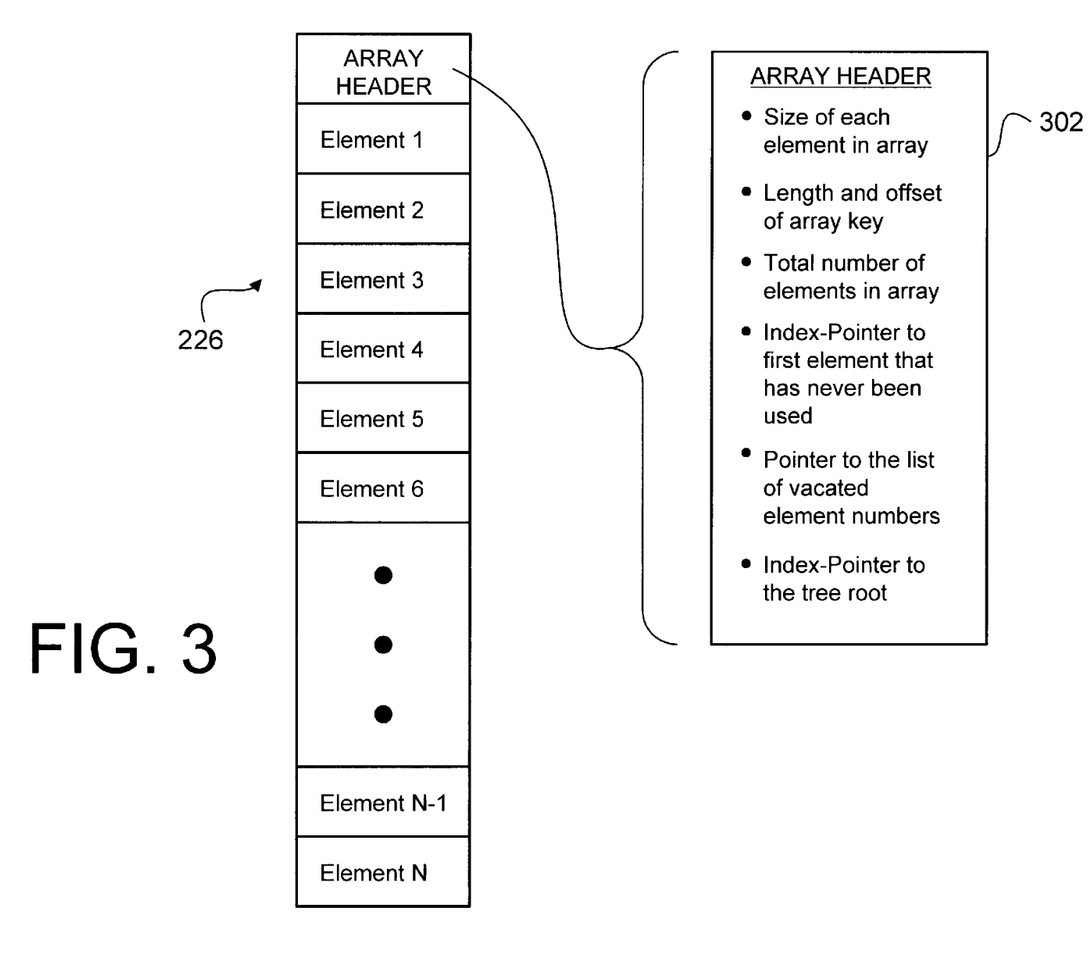

Turning now to FIG. 3, hybrid tree-array database 226 is illustrated with the preferred contents of the array header illustrated at 302. The contents of array header 302 would depend on the type of array used, and whether the array is object-oriented, etc. In an unordered array, the array header 302 preferably includes a data string indicating the size of each element in hybrid tree-array database 226, a data string indicating the length and offset of the array key in the user data, a data string indicating the total number of elements in hybrid tree-array database 226, an index-pointer to the first element in hybrid tree-array database 226 that has never been used, and a pointer to the list of vacated element numbers. In the preferred embodiment the index-pointer to the tree node is also kept in the array header 302, but it could also be kept in separate storage outside the array. Of course other data can be included in the array header depending upon the specific implementation of the hybrid tree-array database.

By specifying the size of each element in the array header 302, the address of each element can be determined and used to access the various elements in the array. The total number of elements in hybrid tree-array database 226 is stored in the array to keep track of the amount of storage used and to assure that data is only stored in the areas of storage assigned to the database 226.

The length and offset of the array key is used to indicate the portion of the user data that is considered the array key. Array keys are usually a field in each array element that cannot be blank and are frequently the data being search with the sequential array search. However, because all user data is searchable via a sequential array search, the array key is optional.

The pointer to the list of vacated element numbers, and an index to the vacated element list, is used by hybrid tree-array database 226 when new data is added or an element is vacated. In particular, when new data is added the list of vacated elements referenced by the pointer is checked to determine if any previously vacated elements are available for the new data. If there are previously vacated elements the new data is added there. When all the previously vacated elements are filled the new data is added to the first element in hybrid tree-array database 226 that has never been used, as referenced by that index-pointer in the array header.

Figure 4:
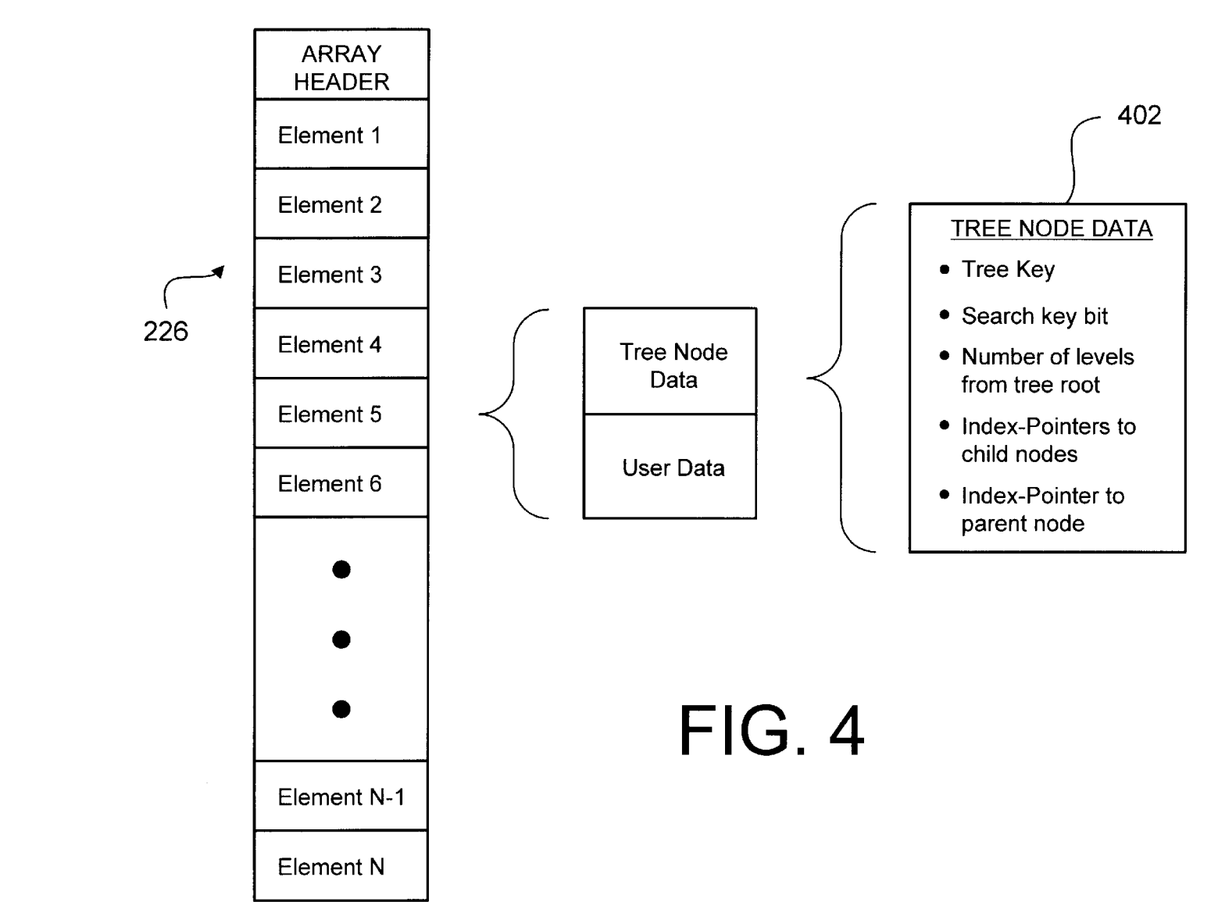
Figure 5:
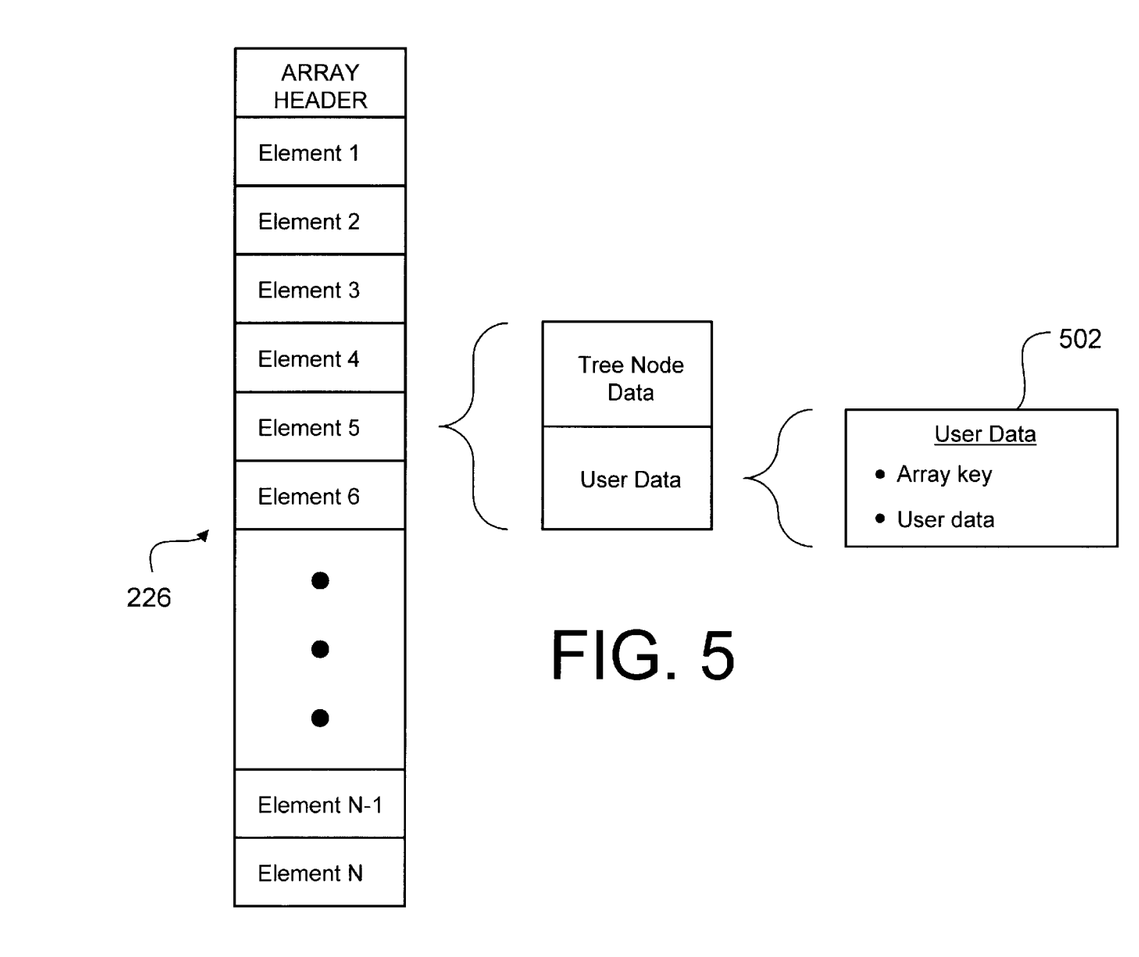

Referring now to FIGS. 4 and 5, the preferred data contained in each element of hybrid tree-array database 226 is illustrated. As stated before, each element includes tree node data and user data.

The tree node data for each element preferably includes all the data necessary to implement the tree. The exact nature of this data would depend upon the type of tree implemented in hybrid tree-array database 226. In most cases, the tree node data would include index-pointers to both the parent of the node, and the children of the node. In addition, the tree node data would include a key used for matching with a searched key in a search process to facilitate fast key searches.

In the preferred embodiment the tree node data for each element is stored in the array element with the user data. In this case the tree node data would not need to include any pointers or indices to the user data.

In an alternate embodiment the tree node data is not stored with the corresponding elements in the array. Instead, all or a portion of the tree node data could be stored in another location. For example, if the tree comprises an object-oriented tree implemented as an remote object, the tree node data could be stored in the memory allocated for that object instead of the memory allocated for the array. In this case, the tree node data would have to include index-pointers to the user data of the corresponding element. In this way the tree implemented by the tree node data could access the user data without having to create a duplicate of the user data, even though the tree node data is not part of the array elements.

Turning now to FIG. 4, tree node data 402 is illustrated with some of the data types needed to implement a object-oriented Patricia tree. In this embodiment, the tree node data preferably comprises a tree key, a search key bit, a string representing the number of levels from this node to the tree root, index-pointers to the child nodes, and an index-pointers to the parent node.

The tree key and the search key bit are used by the tree search routines to perform fast key searches. In the preferred embodiment where the tree aspect of hybrid tree-array database 226 comprises a Patricia tree, the search key bits at each node are used to direct the search routine to the appropriate node, with the search key bit specifying which bit at this node determines which of the children nodes to search next.

The string representing the number of levels from this node to the tree root is used by the tree system to determine when an upwards link is encountered and the search is over.

Again, in the alternative embodiment where the tree node data is not stored in the element with the user data the tree node data would also include index-pointers to the corresponding user data. These index-pointers would then be used to access the corresponding user data when it is searched using tree search routines.

Turning now to FIG. 5, user data 502 is illustrated containing the elements preferably included. The user data 502 can comprise data of any type and length as set up by the hybrid tree-array database. The preferred user data 502 includes an array key. The array key is a string of data in the user data which can be used for sequential key searches through the array. Sequential key searches can be used to find information faster than a normal full field search of the array can, but this type of key search is still not as fast as a tree key search. Typically, the array key is a portion of the user data which will be commonly searched for, such as the author or title of a work represented by the user data. Of course, if sequential key array searching is not needed then the no portion of the user data needs to be specified as a key.

Figure 6:
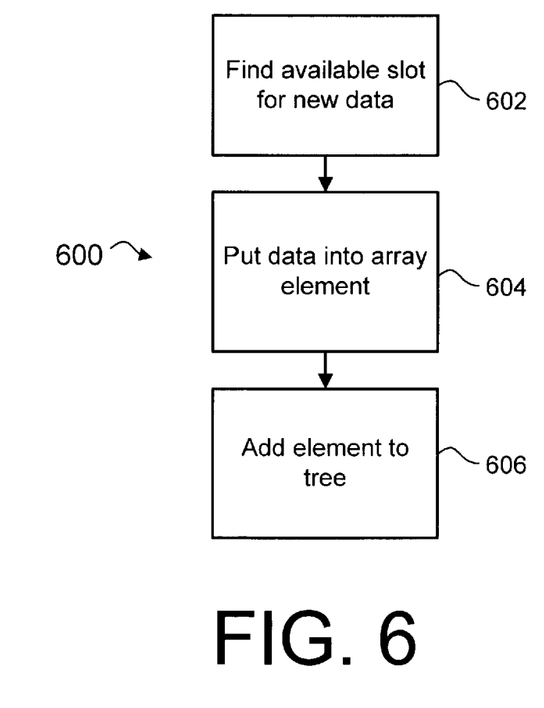
FIG. 6. is a flow diagram illustrating a method for adding data to a hybrid tree-array database in accordance with the preferred embodiment.

When a hybrid tree-array database is to be formed the first step is to allocate storage and initialize the fields in the array header to reflect an empty array (i.e., an array in which no elements contain user data.) At this point, new data can be added to the hybrid tree-array database. Turning now to FIG. 6, a method 600 for storing new data in the preferred hybrid tree-array database is illustrated. The first step 602 is to find an available slot for storing new data in the hybrid tree-array database. In the preferred embodiment this is done by first checking the list of vacated elements to determine if any previously vacated elements are available for the new data. If there are previously vacated elements the new data is added there. In particular, the data is placed in the last vacated element in the list of vacated elements.

If no previously vacated element exists, the new data is added to the next element in hybrid tree-array database 226 that has never been used, as referenced by the index-pointer the array header. The index-pointer is then updated to reference the next element that has never been used.

If no previously vacated element exists and the hybrid tree-array database is full, the size of the database is increased by updating the appropriate data in the array header and the database is relocated if necessary.

The next step 604 is to store the data in the user data portion of the array element. This typically involves zeroing out the array element if it has been used before and copying the new data to the user data fields.

The next step 606 is to add the element to the tree portion of the hybrid tree-array database. This is typically done by calling an ADD routine that determines the place in the tree in which the new element is to be inserted. This is typically done by starting at the tree root and determining if this element, based on its key, should be on this node, the right child or the left child. This process continues down the tree until the correct location in the tree for this element is located.

The ADD routine then adds the required data to the tree node data for this element, including pointers to the child and parent nodes of this element. This data would also include the appropriate key values for use in fast key searching of the tree.

It should be noted that the location of the element in the tree, as reflected by the pointers in the tree node data, is completely independent of the element location in the array and actual storage location in memory. For example, element 1 could be node 4 in the tree, element 2 could be node 1, element 3 could be node 2, element 4 could be node 5 and so on. This independence allows the position of an element in the tree to be adjusted (by changing the pointers in the corresponding tree node data) without having to move its actual storage location in the array. This allows the tree to remain complete even as elements in the array are vacated and refilled.

The exact procedure used to add the element to the appropriate node of the tree will depend on the type and structure of the tree itself. For example, where the tree comprises an object-oriented Patricia tree an ADD function defined by the tree object performs the operations needed to add the element to the tree. The ADD function in this case would also assure that duplicate keys were not created and may reject the addition of the node in certain circumstances.

In the preferred embodiment the ADD function would not need to include index-pointers to the user data location in the array because the user data is in the same element as the tree node data, and therefore accessible once the tree node is found. In the alternate embodiment where the tree node data is stored outside the array the index-pointers to the user data in the array element would have to be created and/or updated, with the array being used to manage storage. The tree, by contrast, is only used to perform tree searches.

It should be reiterated at this point that the step 606 of adding the element to the tree does not involve the obtaining of new storage for the user data or the copying of user data into tree storage. Instead, the only copy of the data remains in the array element, with the tree accessing the data in the array.

Adding new data elements as described above has the advantage of providing relatively compact storage, with limited storage fragmentation problems. Having compact, non-fragmented storage facilitates hardware supported reading ahead which results in faster sequential access times.

Figure 7:
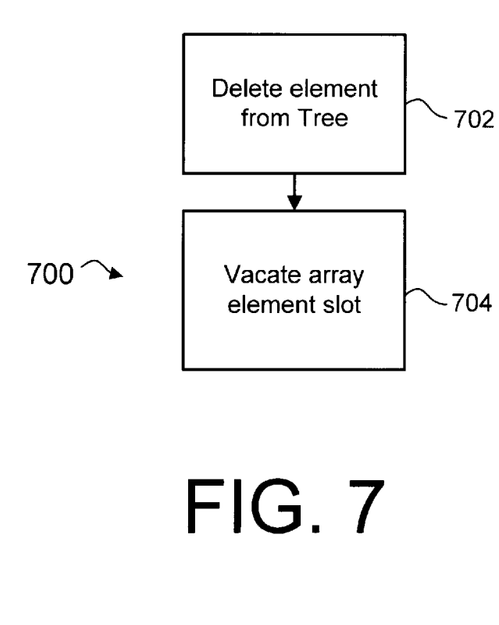
FIG. 7. is a flow diagram illustrating a method for deleting data from a hybrid tree-array database in accordance with the preferred embodiment.

Turning now to FIG. 7, a method 700 for deleting data from a hybrid tree-array database is illustrated. The first step 702 is to delete the element from the tree portion of hybrid tree-array database. In the case of an object-oriented Patricia tree, this is suitably done by calling a DELETE function defined on the tree object. This function finds and removes that node from the tree, and updates the pointers of the tree nodes affected by the change. Again, the exact method of this procedure would depend upon the type of tree used (i.e., balanced, binary, Patricia, etc.).

With the tree node deleted, the next step 704 is to delete the element from the array. In the preferred embodiment this involves vacating the slot in which the element is stored. This is preferably done by setting bits on the Array Key for this element to specify that this is a vacant element. The slot number of the element is then added to the list of vacant elements. Future sequential array searches will then know to skip this element to avoid wasting processing cycles and finding bad data.

Figure 8:
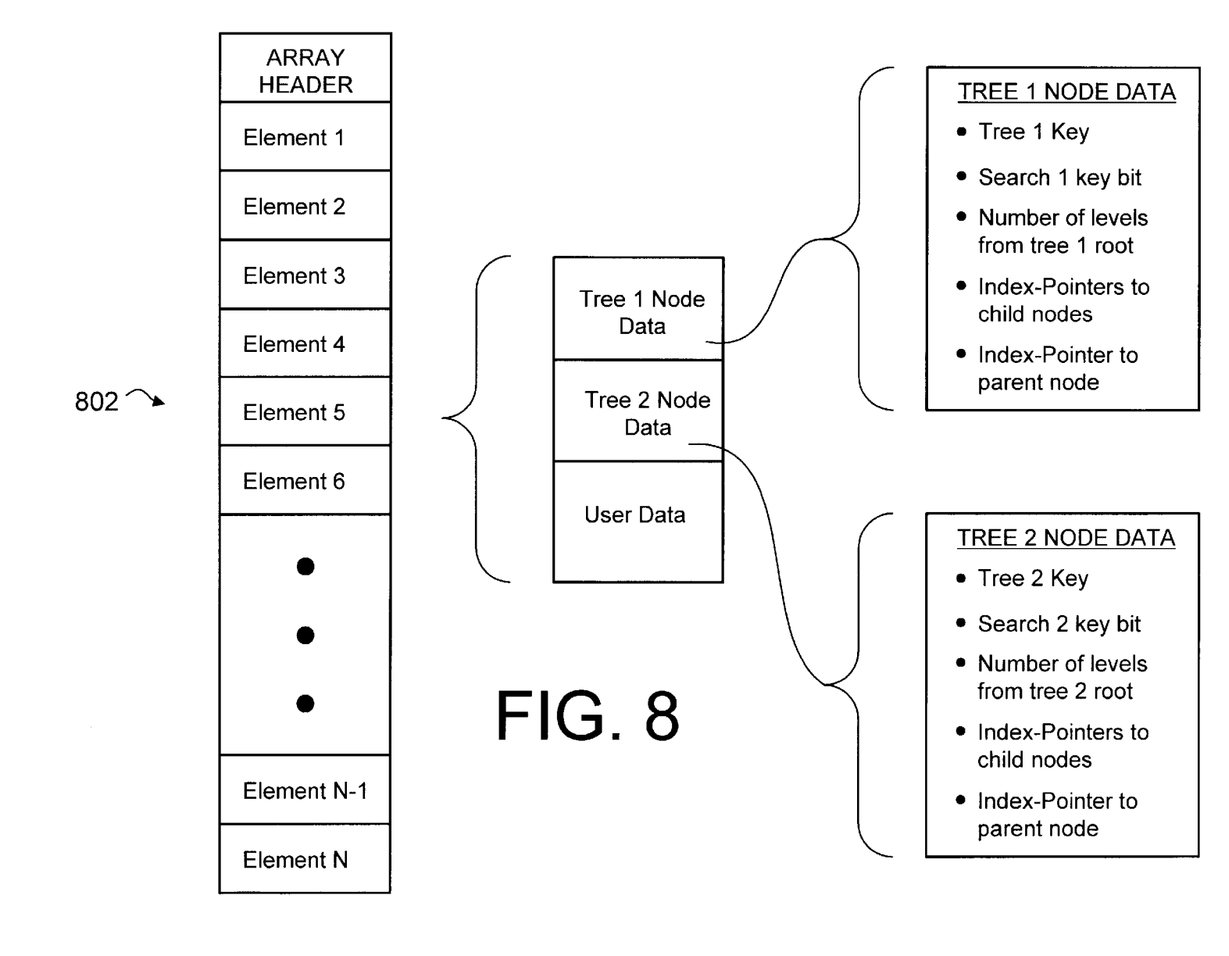
FIG. 8 is a schematic representation of a hybrid tree-array database having two trees in accordance with the preferred embodiment.

The preferred embodiment hybrid tree-array database can be expanded to include a plurality of trees used to reference a hybrid tree-array database. Turning to FIG. 8, a hybrid tree-array database 802 is illustrated in which each element of the hybrid tree-array database is accessible using two different trees. This would allow the data stored in hybrid tree-array 802 to be searched using two different fast key searches using two different tree structures. This is implemented by adding additional sets of tree node data for each element. For each additional tree added to the hybrid tree-array database a set of tree node data is added to each element. The set of tree 1 node data implements one tree, and the set of tree 2 node data implements a second tree. Additional node data could be added for additional trees as need. Because no duplication of the user data is required, the amount of storage needed to implement these trees is minimal. Because the trees are completely independent from each other, they can comprise two completely different types of trees. This allows for further optimization of the fast key searching. For example, an object-oriented Patricia tree can be used to implement tree 1, while an ordinary binary tree can be used to implement tree 2.

As an example of how a hybrid tree-array database with multiple trees could be used follows. Assume that a large database is needed for a software application end-user manual. Suppose it is desirable to have the manual searchable by a sequential table of contents for ease of learning, searchable by "task title" for the new end user, and searchable by "command" for more experienced users. The manual can be implemented using a hybrid tree-array database with a first tree implemented to search by "task title" keys and the second tree implemented to search by "command" keys. This would allow for fast key word searching for the two different keys, as well as the normal sequential array search of the entire manual contents. The ability to do multiple key searches as well as sequential array searches provides unmatched flexibility without excessive storage requirements.

While the invention has been particularly shown and described with reference to an exemplary embodiment using a Patricia Tree and a unordered sequential array, those skilled in the art will recognize that the preferred embodiments can be applied to various other types tree and array structures, and that various changes in form and details may be made therein without departing from the spirit and scope of the invention.

We claim:

1. An apparatus comprising:
   at least one processor;
   a memory coupled to the at least one processor;
   a program residing in the memory, said program providing a hybrid tree-array database, said hybrid tree-array database storing an array of user data portions searchable by a tree key search and by a sequential array search, wherein each user data portion corresponds to a node on a tree and wherein the hybrid tree-array database includes tree node data corresponding to each user data portion, wherein the tree node data corresponding to each user data portion includes an index pointer to other of the user data portions in said array that correspond to children nodes of said corresponding node, said tree node data thereby facilitating said tree key search of said array of user data portions.

2. The apparatus of claim 1 wherein said hybrid tree-array database comprises an unordered array.

3. The apparatus of claim 2 wherein said user data portion and said tree node data corresponding to said user data portion are both stored together in said array of user data portions.

4. The apparatus of claim 1 wherein said tree node data includes a key to facilitate said tree key search.

5. The apparatus of claim 1 wherein said tree node data further includes index-pointers to said corresponding user data portions.

6. The apparatus of claim 1 wherein said tree node data further includes an index-pointer to any parent node of said corresponding node.

7. The apparatus of claim 1 wherein said hybrid tree-array database comprises an unordered array, said unordered array including a plurality of elements, each of said plurality of elements storing one of said user data portions and said corresponding tree node data, wherein said corresponding tree node data includes a key to facilitate said tree key search and further includes an index-pointer to any parent node of the corresponding node.

8. The apparatus of claim 7 wherein said unordered array manages storage of said elements to minimize storage fragmentation.

9. The apparatus of claim 7 wherein said user data portion includes an array key, said array key facilitating said sequential array search of said array of user data portions.

10. The apparatus of claim 7 wherein said unordered array comprises a relocatable array.

11. The apparatus of claim 1 wherein said hybrid tree-array database provides said tree key search and said sequential array search with a single array of user data portions.

12. A method for providing data storage in a computer system, the method comprising the steps of:
   a) providing an array of user data portions searchable by sequential array search, and wherein each user data portion in said array corresponds to a node on a tree; and
   b) providing a plurality of tree node data, each of said plurality of tree node data corresponding to one of said user data portions, and each of said plurality of tree node data including an index-pointer to other of said user data portions that correspond to children nodes of said corresponding node on said tree, said plurality of tree node data combining to implement said tree for searching said plurality of user data portions stored in said array.

13. The method of claim 12 further comprising the step adding a new user data portion to said array and further comprising the step of creating new tree node data corresponding to said new user data portion, wherein the step of creating new tree node data comprises creating a new node and placing said new node in said tree.

14. The method of claim 13 wherein the step of adding a new user data portion to said array comprises determining if a vacant user data portion exists and adding said new user data portion to said vacant user data portion if said vacant user data portion exists and adding said new user data portion to a previously never used user data portion if said vacant user data portion does not exist.

15. The method of claim 12 wherein the step of providing an array comprises providing an unordered array.

16. The method of claim 12 wherein said plurality of tree node data are stored in said array of user data portions.

17. The method of claim 12 wherein each of said plurality of tree node data includes a key to facilitate key searching of said tree.

18. The method of claim 12 wherein said array comprises a relocatable array.

19. The method of claim 12 wherein said tree provides tree key search capability with said single array of user data portions.

20. A program product comprising:

(A) a program, said program providing a hybrid tree-array database, said hybrid tree-array database storing an array of user data portions searchable by a tree key search and by a sequential array search, wherein each user data portion corresponds to a node on a tree and wherein the hybrid tree-array database includes tree node data corresponding to each user data portion, wherein the tree node data corresponding to each user data portion includes an index pointer to other of the user data portions in said array that correspond to children nodes of said corresponding node, said tree node data thereby facilitating said tree key search of said array of user data portions; and (B) signal bearing media bearing said program.

21. The program product of claim 20 wherein said signal bearing media comprises recordable media.

22. The program product of claim 20 wherein said signal bearing media comprises transmission media.

23. The program product of claim 20 wherein said hybrid tree-array database comprises an unordered array.

24. The program product of claim 23 wherein said user data portions and said tree node data corresponding to said user data portion are both stored together in said array of user data portions.

25. The program product of claim 20 wherein said tree node data includes a key to facilitate said tree key search.

26. The program product of claim 20 wherein said tree node data further includes index-pointers to said corresponding user data portions.

27. The program product of claim 20 wherein said tree node data further includes an index-pointer to any parent node of said corresponding node.

28. The program product of claim 20 wherein said hybrid tree-array database comprises an unordered array, said unordered array including a plurality of elements, each of said plurality of elements storing one of said user data portions and said corresponding tree node data, wherein said corresponding tree node data includes a key to facilitate said tree key search and further includes an index-pointer to any parent node of the corresponding node.

29. The program product of claim 28 wherein said unordered array manages storage of said elements to minimize storage fragmentation.

30. The program product of claim 28 wherein said user data portion includes an array key, said array key facilitating said sequential array search of said array of user data portions.

31. The program product of claim 28 wherein said unordered array comprises a relocatable array.

32. The program product of claim 20 wherein said hybrid tree-array database provides said tree key search and said sequential array search with aid single array of user data portions.

33. An apparatus comprising:
 a) at least one processor;
 b) a memory coupled to the at least one processor; and
 c) a computer program residing in the memory, said computer program including a hybrid tree-array database including:
  i) an unordered array
  ii) a plurality of elements in said unordered array;
  iii) a plurality of user data portions, each of said plurality of user data portions stored in one of said plurality of elements;
  iv) a plurality of tree node data, said plurality of tree node data implementing a tree having a plurality of tree nodes, each of said plurality of tree node data corresponding to one of said plurality of tree nodes and one of said plurality of user data portions, each of said tree node data including a key to facilitate key tree searching and an index-pointer to any child and parent nodes of said corresponding tree nodes.

34. The apparatus of claim 33 wherein each of said plurality of tree node data is stored in one of said plurality of elements with said corresponding user data portion.

35. The apparatus of claim 33 wherein said unordered array manages storage allocation of said memory to avoid fragmentation.

36. The apparatus of claim 33 wherein said hybrid tree-array database comprises a single copy of said plurality of user data portions to minimize utilization of said memory.

37. The apparatus of claim 33 wherein said unordered array includes an array header, said array header including an index-pointer to a list of vacated elements, wherein said vacated elements comprise elements of said unordered array having no user data and no corresponding tree node.

38. The apparatus of claim 33 wherein said tree comprises a Patricia tree.

39. The apparatus of claim 33 wherein said each of said plurality of user data portions include an array key, said array key facilitating an array key search of said user data portions.

40. The apparatus of claim 33 further comprising a second plurality of tree node data, said second plurality of tree node data implementing a second tree having a second plurality of tree nodes, each of said second plurality of tree node data corresponding to one of said second plurality of tree nodes and one of said plurality of user data portions, each of said second tree node data including a key to facilitate key tree searching and an index-pointer to any child and parent nodes of said corresponding second tree nodes.

41. A method for providing data storage in a computer system, the method comprising the steps of:
 a) providing an unordered array having a plurality of elements, each of said plurality of elements including a user data portion, said unordered array providing sequential array search capability of said plurality of user data portions;
 b) providing a plurality of tree node data, each of said plurality of tree node data including a key, said plurality of tree node data combining to implement a tree having a plurality of tree nodes, each of said plurality of tree node data corresponding to one of said user data portions and each of said plurality of tree nodes corresponding to one of said plurality of elements, said plurality of tree node data facilitating tree key searching of said plurality of user data portions stored in said array;
 c) adding a new user data portion to one of said plurality of elements in said array; and
 d) creating new tree node data corresponding to said new data, wherein the step of creating new tree node data comprises creating a new tree node and placing said new tree node in said tree.

42. The method of claim 41 wherein the step of adding a new user data portion to one of said plurality of elements comprises determining if a vacant element exists and adding said new data portion to said vacant element if said vacant element exists and adding said new data portion to a previously never used element if said vacant element does not exist.

43. The method of claim 41 wherein said plurality of tree node data are stored in said plurality of elements with said corresponding user data portions.

44. The method of claim 41 wherein said unordered array comprises a relocatable unordered array.

45. A program product comprising:
   (A) a program, said program providing a hybrid tree-array database, said hybrid tree-array database including:
   i) an unordered array
   ii) a plurality of elements in said unordered array;
   iii) a plurality of user data portions, each of said plurality of user data portions stored in one of said plurality of elements;
   iv) a plurality of tree node data, said plurality of tree node data implementing a tree having a plurality of tree nodes, each of said plurality of tree node data corresponding to one of said plurality of tree nodes and one of said plurality of user data portions, each of said tree node data including a key to facilitate key tree searching and an index-pointer to any child and parent nodes of said corresponding tree nodes; and
   (B) signal bearing media bearing said program.

46. The program product of claim 45 wherein said signal bearing media comprises recordable media.

47. The program product of claim 45 wherein said signal bearing media comprises transmission media.

48. The program product of claim 45 wherein each of said plurality of tree node data is stored in one of said plurality of elements with said corresponding user data portion.

49. The program product of claim 45 wherein said unordered array manages storage allocation of said memory to avoid fragmentation.

50. The program product of claim 45 wherein said hybrid tree-array database comprises a single copy of said plurality of user data portions to minimize utilization of said memory.

51. The program product of claim 45 wherein said unordered array includes an array header, said array header including an index-pointer to a list of vacated elements, wherein said vacated elements comprise elements of said unordered array having no user data and no corresponding tree node.

52. The program product of claim 45 wherein said tree comprises a Patricia tree.

53. The program product of claim 45 wherein said each of said plurality of user data portions include an array key, said array key facilitating an array key search of said user data portions.

54. The program product of claim 45 further comprising a second plurality of tree node data, said second plurality of tree node data implementing a second tree having a second plurality of tree nodes, each of said second plurality of tree node data corresponding to one of said second plurality of tree nodes and one of said plurality of user data portions, each of said second tree node data including a key to facilitate key tree searching and an index-pointer to any child and parent nodes of said corresponding second tree nodes.

* * * * *